United States Patent
Brugger et al.

[11] Patent Number: 5,963,698
[45] Date of Patent: Oct. 5, 1999

[54] SPLICING DEVICE FOR WELDING OPTICAL FIBERS

[75] Inventors: Rudolf Brugger, Puchheim; Dieter Krause, Spielberg, both of Germany

[73] Assignee: Siemens Aktiengesellschaft, Munich, Germany

[21] Appl. No.: 08/913,073

[22] PCT Filed: Mar. 7, 1996

[86] PCT No.: PCT/DE96/00413

§ 371 Date: Sep. 5, 1997

§ 102(e) Date: Sep. 5, 1997

[87] PCT Pub. No.: WO96/27811

PCT Pub. Date: Sep. 12, 1996

[30] Foreign Application Priority Data

Mar. 7, 1995 [DE] Germany .......................... 195 07 885

[51] Int. Cl.[6] .................................................. G02B 6/255
[52] U.S. Cl. ................................ 385/95; 385/96; 385/97; 385/139
[58] Field of Search ................................ 385/95, 96, 97, 385/139, 98, 99, 134, 135

[56] References Cited

U.S. PATENT DOCUMENTS

| | | | |
|---|---|---|---|
| 4,220,394 | 9/1980 | Tardy | 385/95 X |
| 4,548,630 | 10/1985 | Biedka | 65/2 |
| 4,598,974 | 7/1986 | Munn et al. | 385/95 X |
| 4,687,287 | 8/1987 | Lukas et al. | 385/98 X |
| 5,218,184 | 6/1993 | Hakoun et al. | 385/95 X |

FOREIGN PATENT DOCUMENTS

| | | | |
|---|---|---|---|
| 0 233 709 | 8/1987 | European Pat. Off. | 385/95 X |
| 0 321 947 | 6/1989 | European Pat. Off. | 385/95 X |
| 2 222 467 | 3/1990 | United Kingdom | 385/95 X |

*Primary Examiner*—Brian Healy
*Attorney, Agent, or Firm*—Hill & Simpson

[57] ABSTRACT

A splicing device for welding optical fibers in or close to optical components, in particular optical fiber plug connectors, comprises a first receptacle for the optical component and the associated first optical fiber, an axial adjustable second receptacle for the second optical fiber, an optical device for observing the optical fiber ends to be welded, and two electrodes arranged at a distance from each other, with the first receptacle being mounted so that it can pivot about a pivot axis that is aligned parallel to an axial direction in such a way that the end of the first optical fiber that is located in or close to the optical component can be pivoted in between the two electrodes.

12 Claims, 8 Drawing Sheets

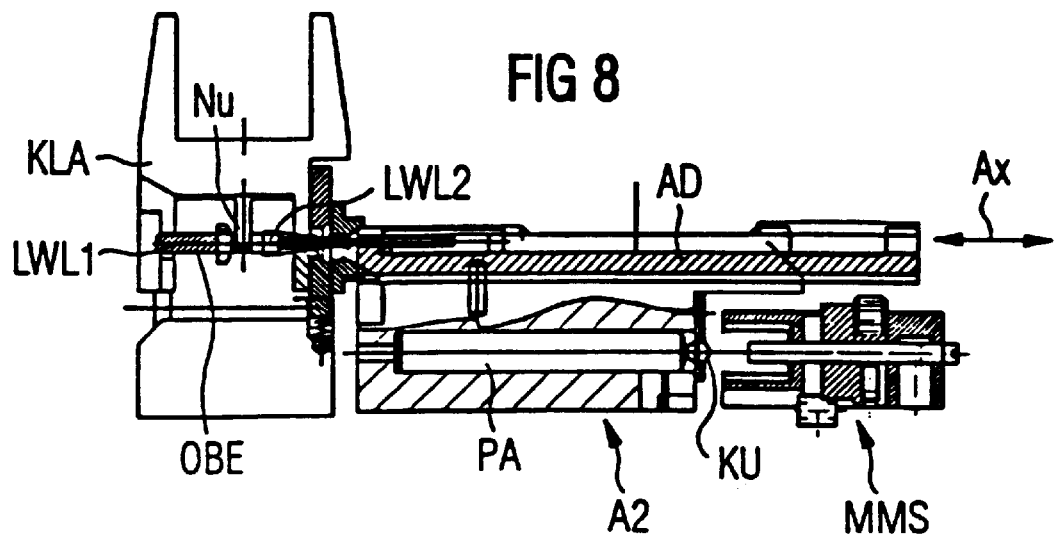
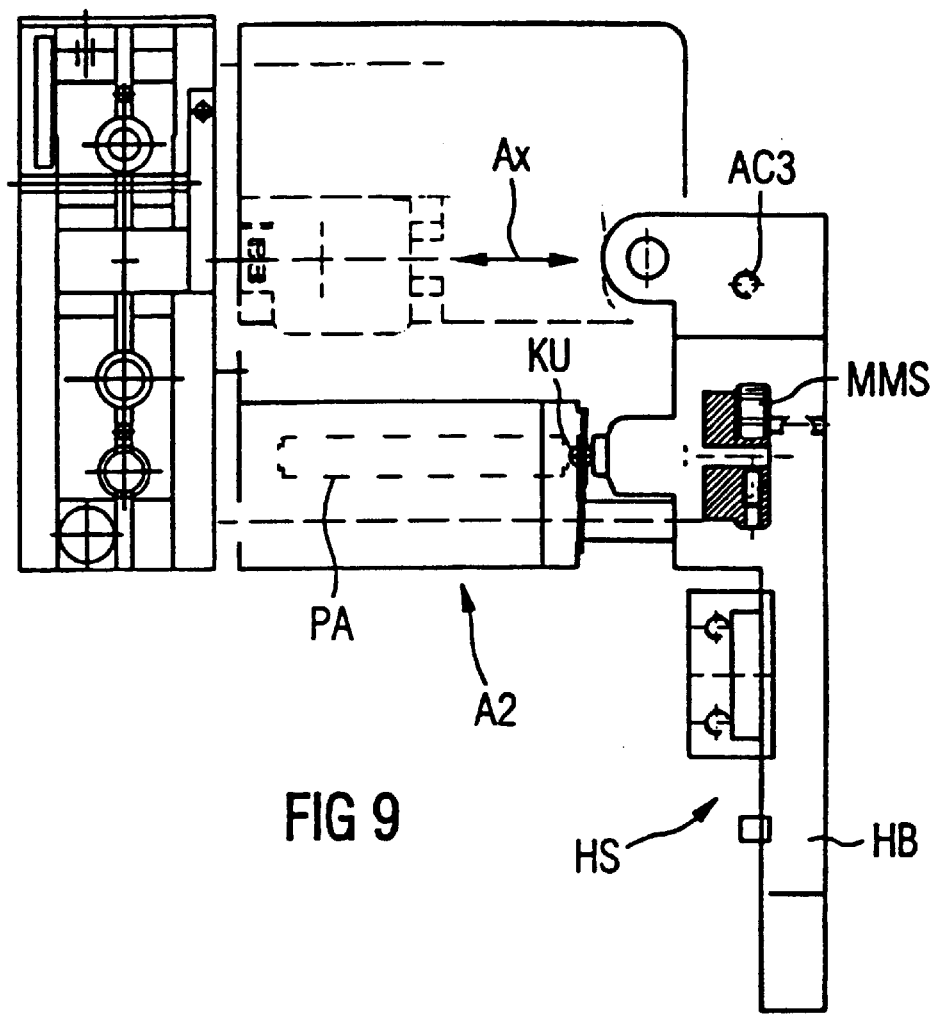

5,963,698

SPLICING DEVICE FOR WELDING OPTICAL FIBERS

BACKGROUND OF THE INVENTION

In order to detachably connect optical fibers together, use is made of optical fiber plug connectors, in whose plug connector parts, which are hollow cylindrical and consist of ceramic, the glass fibers to be coupled are intended to be bonded as centrally as possible. In this case, it is already previously known to bond short glass fibers pieces into the end regions of the plug connector parts, and to couple up the optical fibers extending into these plug connector parts to the fiber pieces with the aid of an immersion liquid. However, the advantage of exact centering of the glass fibers in the coupling region is opposed here by the disadvantage of high attentuation of the coupling points within the plug connector parts. In addition, there is the risk that the immersion liquid will dry out. The introduction of contaminants into the coupling region can scarcely be avoided when pushing the optical fiber into the associated plug connector parts.

The abovementioned disadvantages of coupling optical fibers with the aid of an immersion liquid can be avoided by welding the optical fibers. Appropriate splicing devices for welding optical fibers, such as known from U.S. Pat. No. 5,218,184, for example, are, however, not suitable for coupling glass fibers bonded into the ceramic plug connector parts to optical fibers leading, in or close to the plug connector parts.

U.S. Pat. No. 4,220,394 discloses an optical fiber plug connector whose hollow cylindrical plug connector parts have, in the region of the butt point between the bonded-in glass fiber piece and the optical fiber leading further, four openings which are arranged opposite one another in pairs. In the region of these openings, it is then possible for the two optical fibers to be welded to each other with the aid of a microwelding torch. The nozzle of the microwelding torch, which is designed as a hollow needle, is in this case introduced into one of the four openings, and the remaining openings can be used for introduction of a gripper and for the illumination and observation of the splice point.

U.S. Pat. No. 4,598,974 discloses another optical fiber plug connector whose hollow cylindrical plug connector parts, in the region of the butt point between the bonded-in glass fiber piece and the optical fiber leading further, have a splicing chamber. Two electrodes project into this splicing chamber and, by igniting an arc, effect the welding of the two optical fibers. The two electrodes are integral constituent parts of the optical fiber plug connectors, which remain on the associated plug connector parts even after the splicing operation.

SUMMARY OF THE INVENTION

An object of the present invention is to provide a solution for the problem of providing a splicing device for welding optical fibers and with which glass fibers bonded into the ceramic plug connector parts can be welded onto optical fibers leading or extending, in or close to the plug connector parts. The accessibility of the splice points located inside the plug connector parts can in this case be ensured, for example, by an appropriate transverse-axial groove of a plug connector part.

To accomplish this object, the invention is directed to a splicing device for welding optical fibers in or close to optical components, which include optical filter plug connectors. The device comprises a first receptacle for the optical component and an associated first optical fiber; a second receptacle for a second optical fiber, the second receptacle being adjustable in an axial direction of the optical fibers to be welded; an optical device for observing the ends to be welded of the optical fibers; and two electrodes, which are arranged at a distance from each other and effect the welding of the optical fibers by igniting an arc, the first receptacle being mounted so that it can pivot about a pivot axis that is aligned parallel to the axial direction in such a way that that end of the first optical fiber which is located in or close to the optical component can be pivoted inbetween the two electrodes.

The invention is based on the discovery that, in the event of pivoting the plug connector part, which is held in a first receptacle, and the glass fiber bonded therein between the welding electrodes, and in the event of pushing in axially the optical fiber held in a second receptacle, optimum conditions are provided for the adjustment of the optical fibers to be connected to each other and for the quality of the weld.

In addition to the use outlined as a plug connector splicing instrument, the splicing device according to the invention can be generally used as well for welding optical fibers in or close to other optical components.

BRIEF DESCRIPTION OF THE DRAWINGS

FIG. 8 is a side view with portions broken away of the splice point of the splicing device according to FIG. 1 and the second receptacle, adjustable in the axial direction, for the second optical fiber;

FIG. 9 is a plan view of the second receptacle according to FIG. 8;

DESCRIPTION OF THE PREFERRED EMBODIMENT

Figure 1:
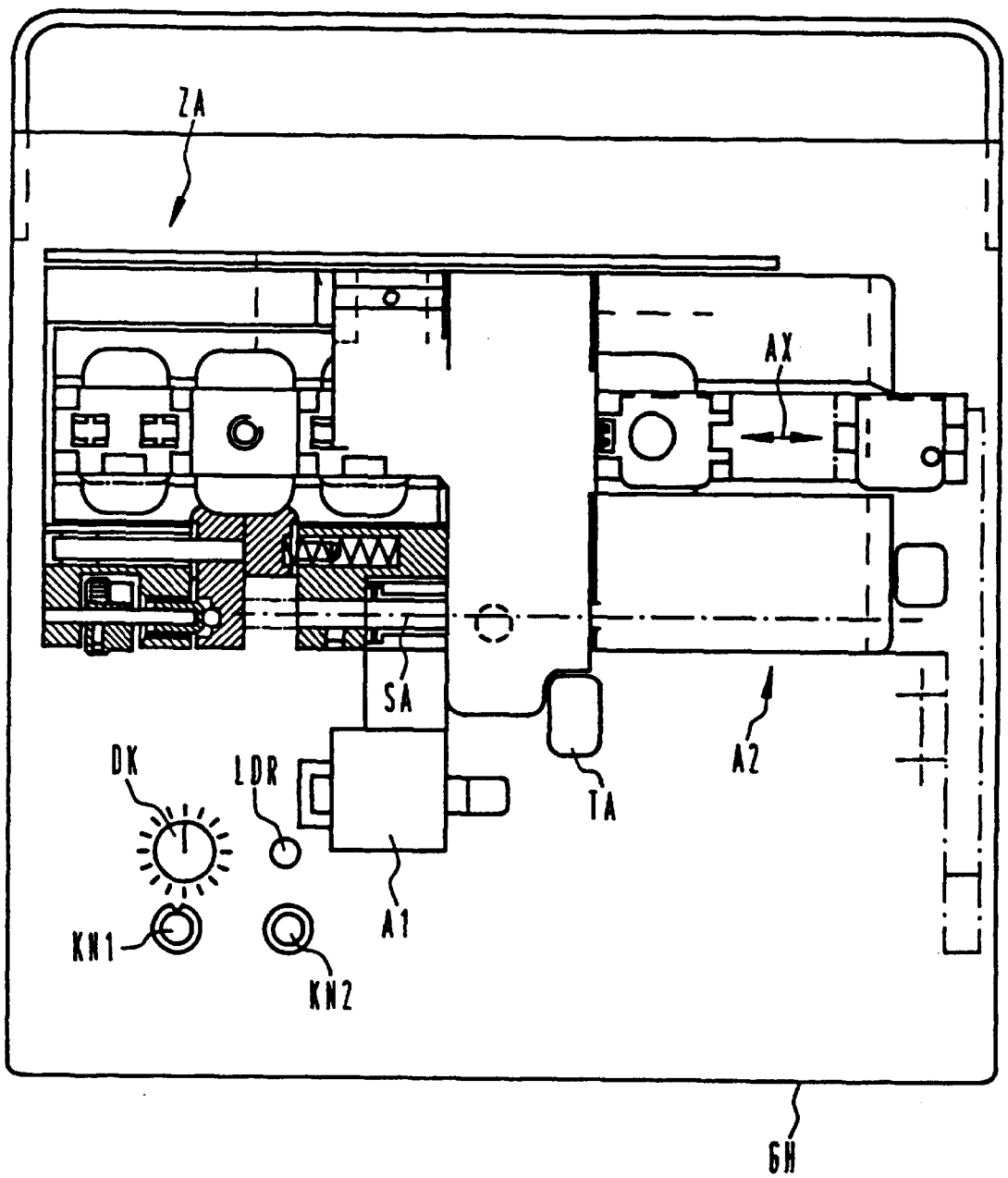
FIG. 1 is a plan view of a splicing device for welding optical fibers in optical fiber plug connectors.
Figure 2:
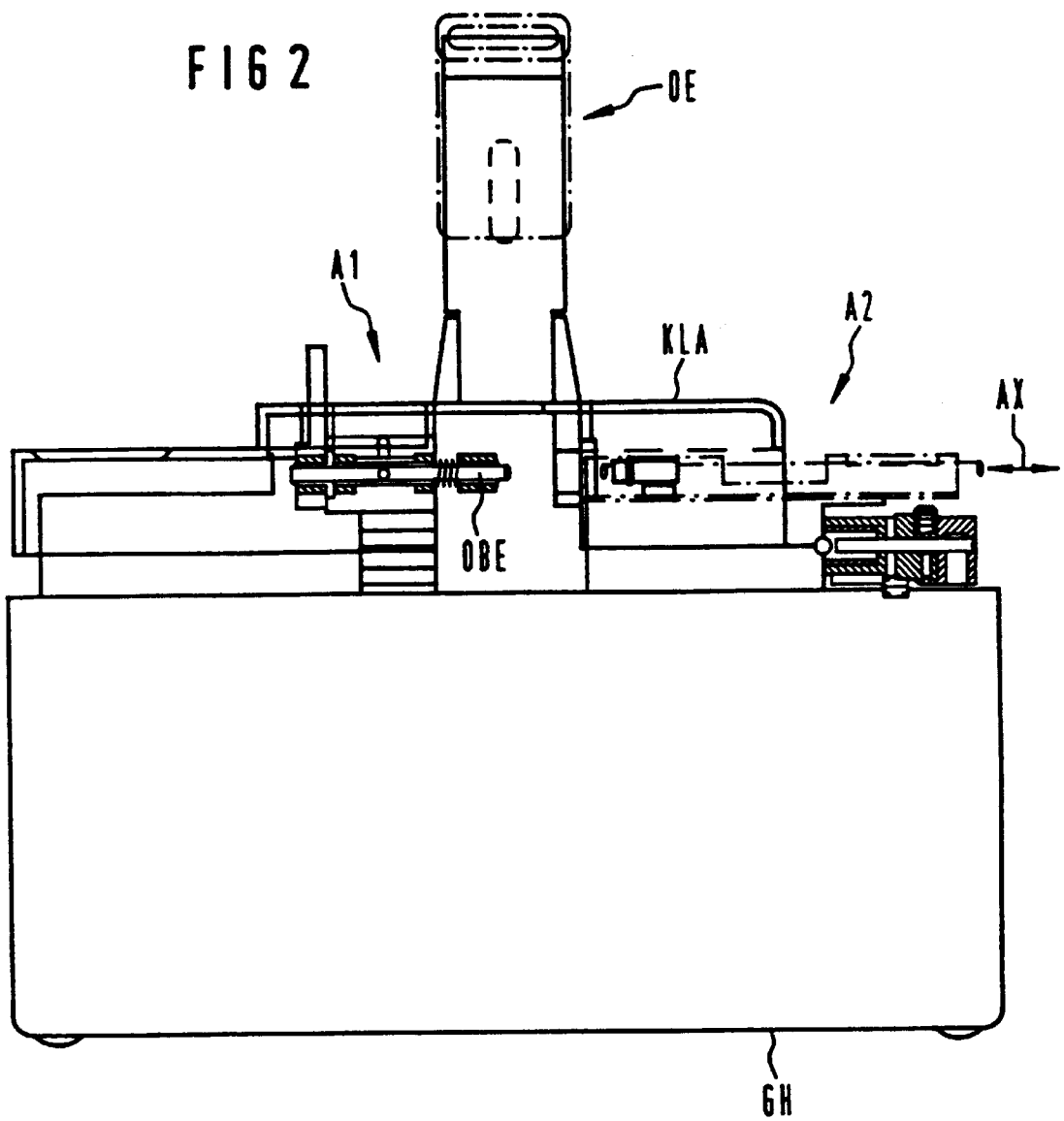
FIG. 2 is a first side view of the splicing device according to FIG. 1.
Figure 3:
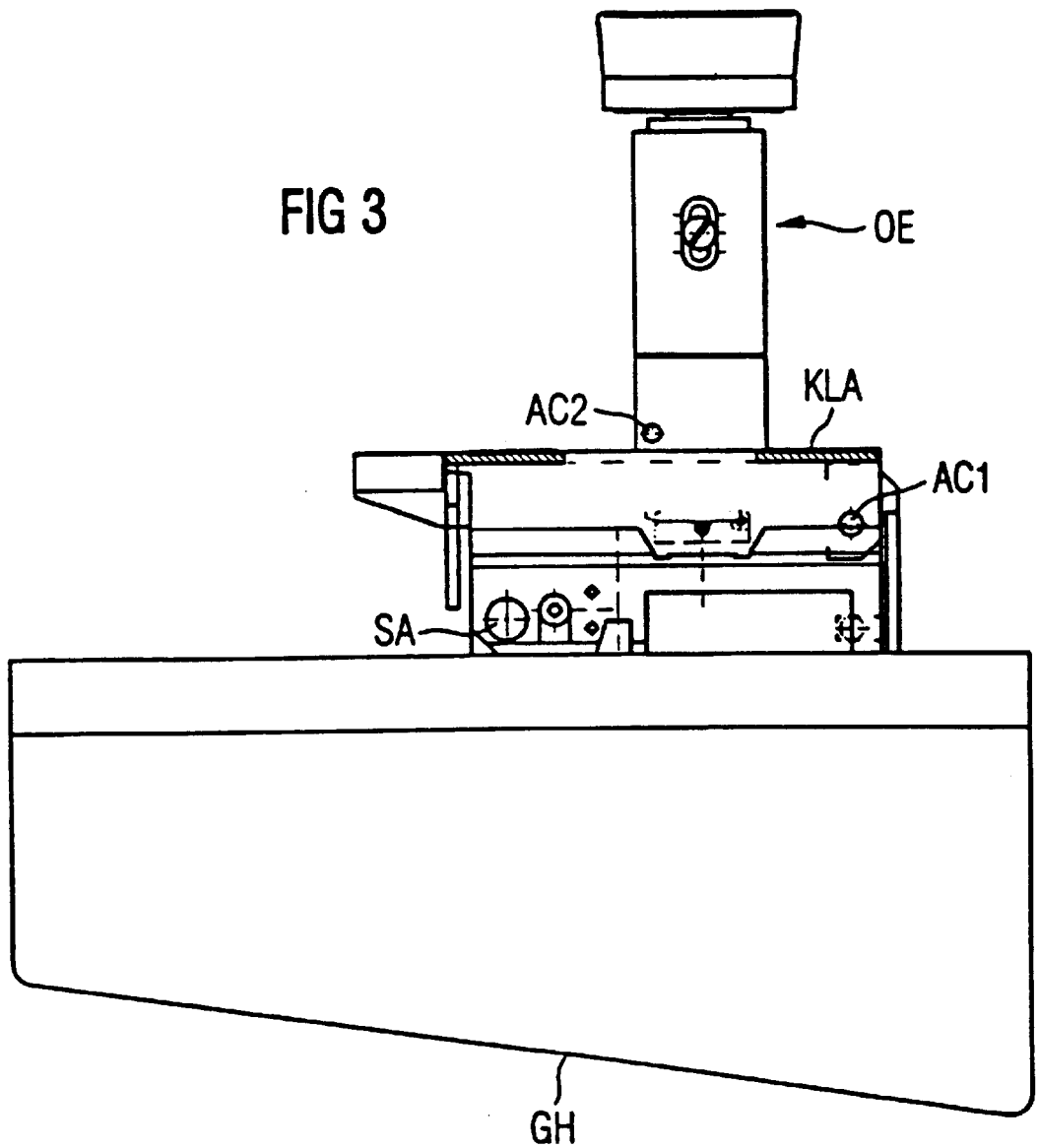
FIG. 3 is a second plan view of the splicing device according to FIG. 1.
Figure 12:
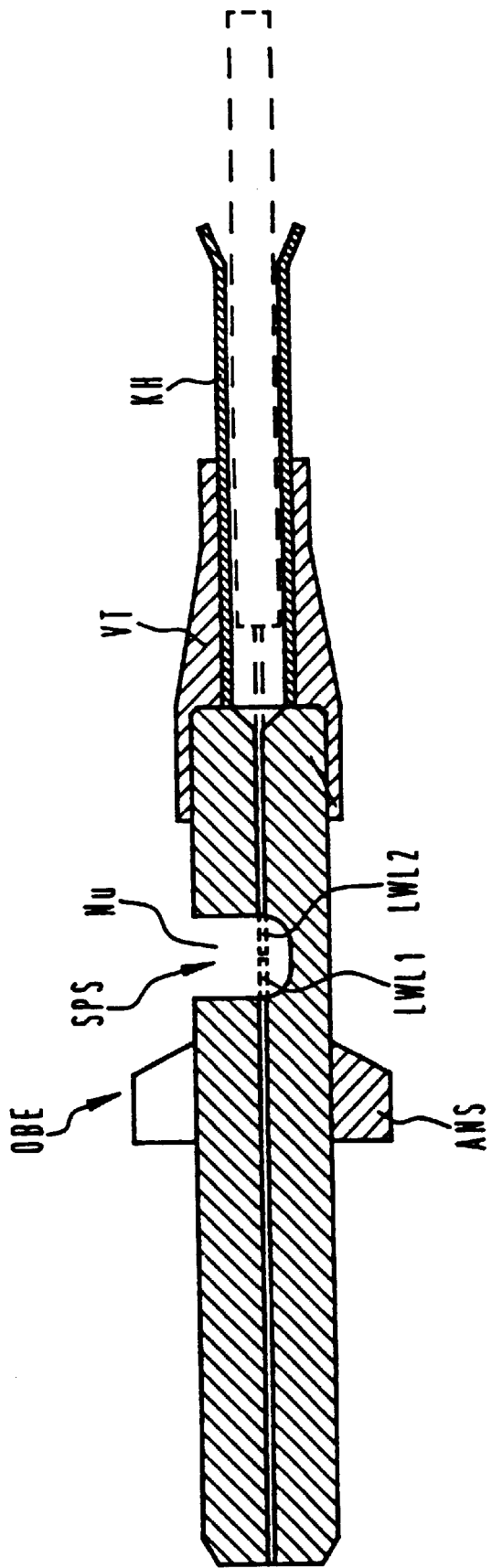
FIG. 12 is a longitudinal cross sectional view of the optical fiber plug connector after the welding of the optical fibers.

FIGS. 1 to 3 show a plan view and two different side views of a splicing device for welding optical fibers in optical components. The optical components OBE, which can be seen in FIG. 2, in FIG. 8 and in particular in FIG. 12, is an optical fiber plug connector made of ceramic. Bonded into the optical component OBE is a short piece of a first optical fiber LWL1, which in the region a transverse-axial groove NU of the optical component OBE is intended to be connected to a second optical fiber LWL2 by means of welding (cf. FIGS. 8 and 12).

In order to hold the optical component OBE and the associated first optical fiber LWL1, a first receptacle A1 is used, which can be pivoted about a pivot axis designated by SA. The first receptacle A1, which is shown in the pivoted up state in FIG. 1, can be pivoted downward about the pivot axis SA in such a way that the end of the first optical fiber LW1 lies opposite and axially aligned with the end of the second optical fiber LWL2 in the splicing region.

In order to receive the second optical fiber LWL2, a second receptacle A2 is used, which is illustrated in FIGS. 1 and 2 and can be adjusted in the axial direction AX.

In order to observe the ends to be welded together of the optical fibers LWL1 and LWL2, provision is made of an optical device OE, which can be seen in FIGS. 2 and 3 and is arranged on a pivotable flap KLA. According to FIG. 3, the flap KLA can be pivoted up about an axis AC1. FIG. 3 also shows that the optical device OE for its part can be pivoted on the flap KLA about an axis AC2 and by this means can be laid against the flap KLA when the welding device is being transported. The optical device OE can be constructed as a microscope or else as an imaging device which images the splicing region on a monitor.

As an alternative to the pivotable first receptacle A1, it is also possible for an additional receptacle, designated by ZA in FIG. 1, to be used for optical fibers LWL1, so that the special instrument can also be used as a normal splicing device for welding optical fibers.

Figure 10:
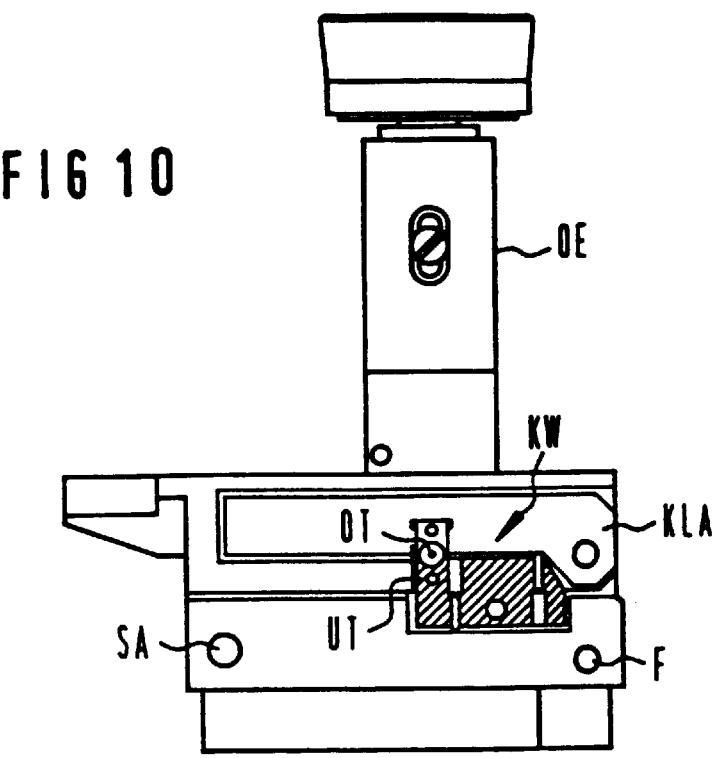
FIG. 10 is an axial plan view with portions broken away of a crimp tool that is integrated into the splicing device of FIG. 1.
Figure 11:
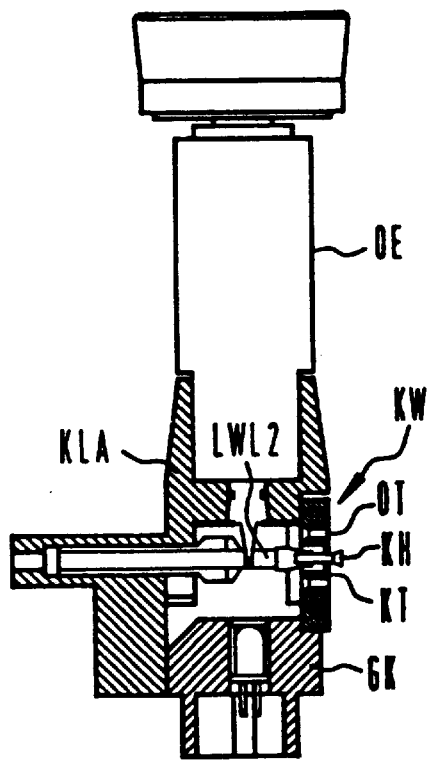
FIG. 11 is a cross sectional view of the crimp tool of FIG. 10.

In the plan view according to FIG. 1, it is also possible to see a first knob KN1 for switching on the instrument, a second knob KN2 for prewelding and main welding, a red light-emitting diode LDR for indicating the switched-on state, a rotary knob DK for setting various welding programs, and a push button TA for opening and closing the flap KLA and for actuating a crimping tool KW illustrated in FIGS. 10 and 11.

Figure 4:
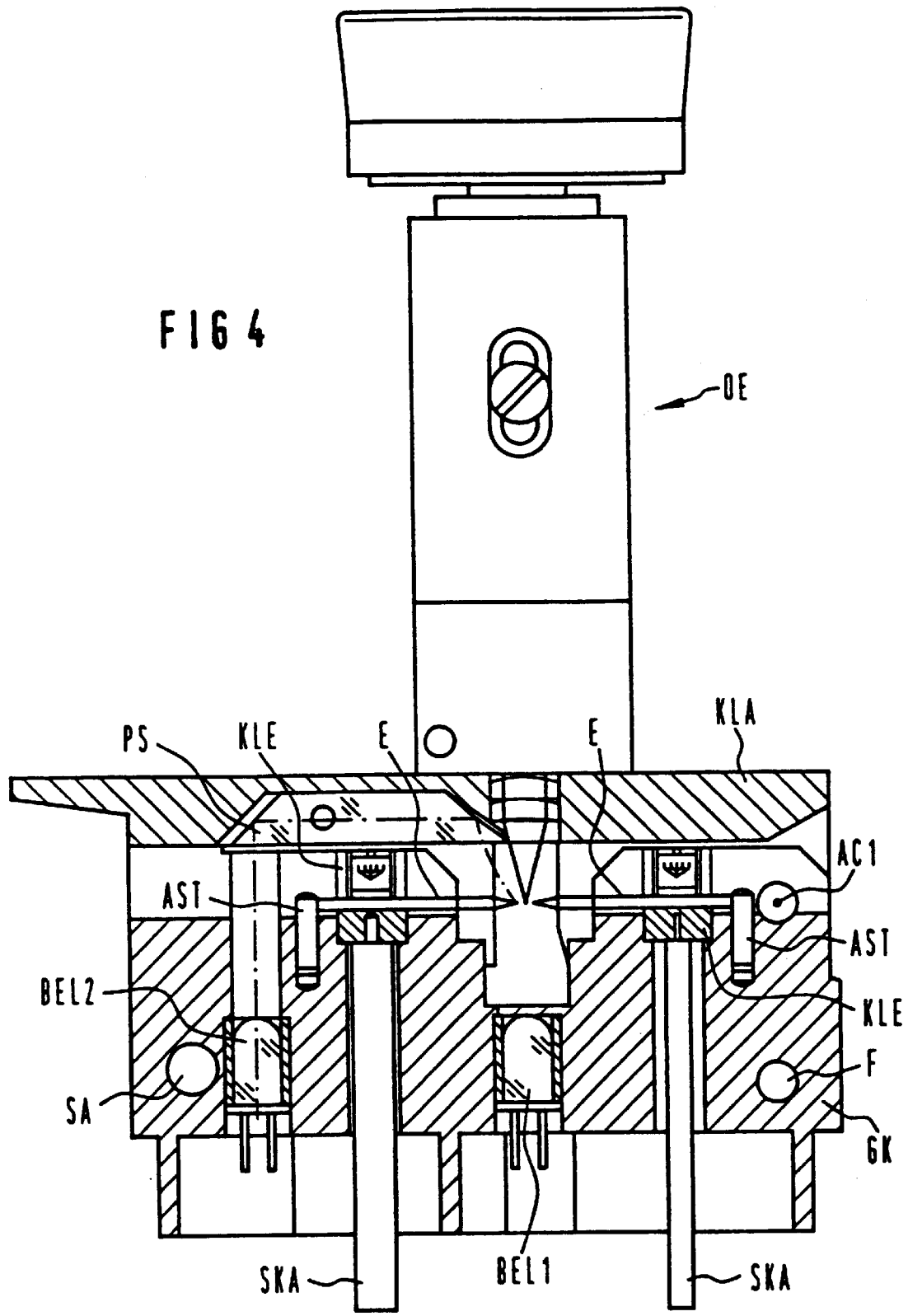
FIG. 4 is a cross sectional view through the splicing device according to FIG. 1 at the level of the splice point.

FIG. 4 shows the actual splicing region having two electrodes E which are arranged at a distance from each other and, by igniting or creating an arc, effect the welding of the optical fibers LWL1 and LWL2, which are not illustrated here in more detail (cf. FIG. 8). The two electrodes E are in each case connected via clamps KLE to associated welding cables SKA for the supply of the welding current. In order to set the axial distance between the two electrodes E, stop pins AST are provided to engage the ends of the electrodes E.

Arranged on the basic body GK, which serves as electrode holder, is the axis AC1 which has already been mentioned and on which the flap KLA is pivotable mounted together with the optical device OE. In the basic body GK, which consists of an electrically insulating plastic, there are also arranged a first illumination device BEL1 for transmitted light illumination of the splice point and a second illumination device BEL2 for incident illumination of the splice point, both the illumination devices being formed by light-emitting diodes. Associated with the second illumination device BEL2 is a prismatic rod PS which is arranged in the flap KLA and which directs the light onto the splice point at an angle of 60° to the horizontal direction.

Figure 5:
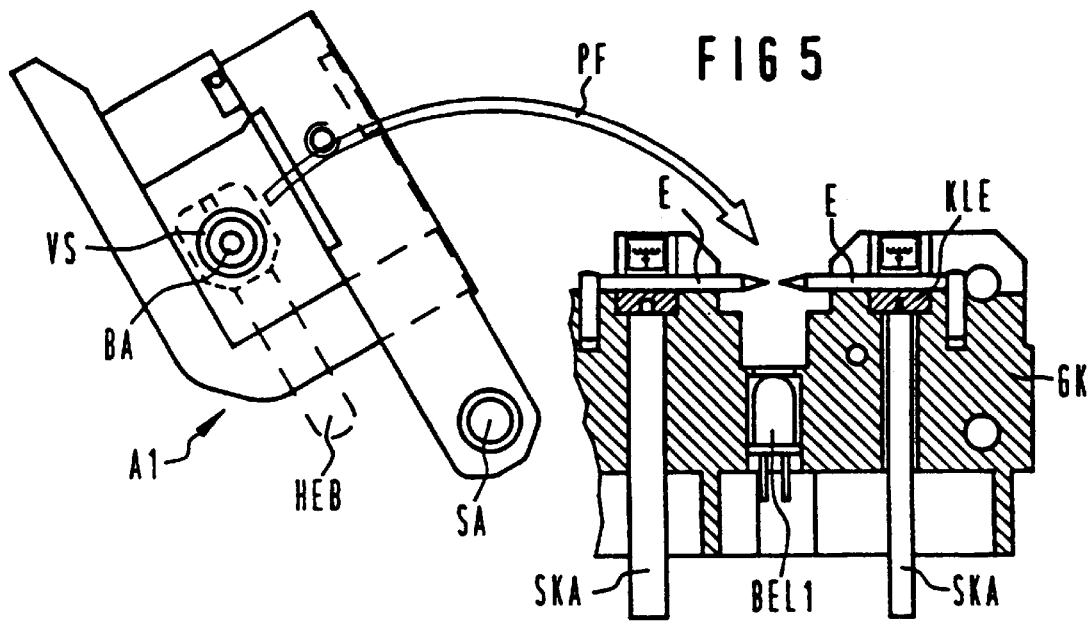
FIG. 5 is a side view with portions broken away to show the principle of providing the first optical fiber located in the optical fiber plug connector between the electrodes that are arranged at the level of the splice point.

FIG. 5 shows how the optical component OBE that is rotatably arranged in the first receptacal A1, together with the end of the first optical fiber LWL1, is introduced between the two electrodes E by pivoting the first receptacle A1 about the pivot axis SA in the direction of the arrow PF. The optical component OBE, which is not illustrated in FIG. 5, is inserted into a hollow cylindrical component receptacle BA which for its part is arranged in an anti-rotational means VS. Using a lever HEB, the component receptacle BA with the optical component OBE can be rotated. In this case, the welding position of the lever HEB is illustrated in FIG. 5, in which position the groove NU of the optical component OBE runs in alignment with the electrodes E.

Figure 6:
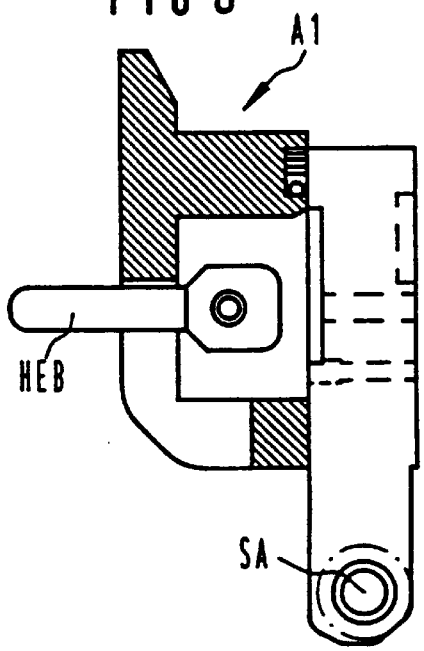
FIG. 6 is a side view with portions broken away of the first receptacle necessary for the pivoting operation according to FIG. 5.

FIG. 6 shows the lever HEB in a second position, which is rotated through 90° from the position of the lever HEB in FIG. 5. In the second position the groove NU of the optical component OBE is aligned in such a way that transmitted light illumination of the splice point from below is enabled with the aid of the first illumination device BEL1.

Figure 7:
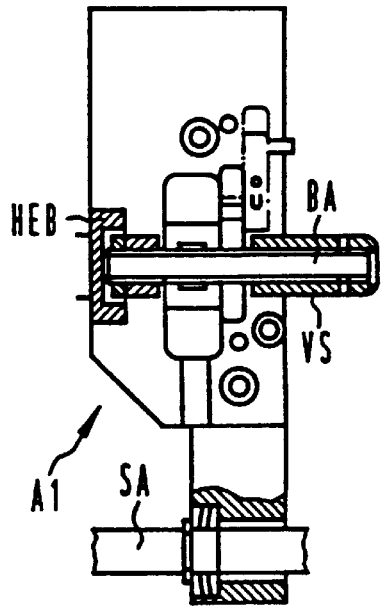
FIG. 7 is a plan view of the first receptacle illustrated in FIGS. 4 and 5.

FIG. 7 shows a plan view of the first receptacle A1 in the position of the lever REB illusrated in FIG. 6.

FIG. 8 and 9 show the construction and the mode of operation of the second receptacle A2, which can be adjusted in the axial direction AX of the optical fibers LW1 and LW2 to be welded, for the second optical fiber LWL2. The second receptacle A2 in this case carries an interchangeable adapter AD for holding the fiber or the cable of the second optical fiber LWL2. For the purpose of coarse adjustment of the second receptacle in the axial direction AX, and for the purpose of inserting the second optical fiber LWL2 into the optical component OBE, use is made of a lever system HS having a lever HB that can pivot about an axis AC3. The axial guidance of the second receptacle A2 is performed in this case by the pivot axis SA and a guide F, running parallel thereto, both of which are illustrated by way of example in FIG. 4. After the outlined coarse adjustment, axial fine adjustment of the second receptacle A2 is carried out with the aid of a micrometer screw MMS arranged on the lever HB and a ball KU. The axial fine adjustment sets the axial gap between the two optical fibers LWL1 and LWL2 within the optical component OBE, for example to a value of 7 to 10 $\mu$m. During the actual welding operation, the second optical fiber LWL2 must then be pushed further in the axial direction AX, and this axial delivery movement in the second receptacle A2 is performed automatically by a piezoelectric drive PA adjacent to the ball KU.

FIGS. 10 and 11 show a crimping tool KW, integrated into the splicing device, for a crimp sleeve KH which is to be connected to the cable of the second optical fiber LWL2 and the optical components OBE. The lower part UT of the crimping tool KW is firmly arranged in the basic body GK, whereas the upper part OT is fitted in the flap KLA. By this means, following the actuation of the push button TA (cf. FIG. 1), a crimping operation is initiated when the flap KLA is closed.

FIG. 12 shows a longitudinal section through the optical component OBE, which is constructed as an optical fiber plug connector. As has already been mentioned in connection with FIGS. 2 and 8, a short piece of the first optical fiber LWL1 is bonded into the optical component OBE, and this piece is connected by welding to the optical fiber LWL2 in the region of the transverse-axial groove NU. The splice point is designated by SPS. The crimp sleeve KH already mentioned in connection with FIG. 11 effects a secure connection between the cable of the second optical fiber LWL2 and the ceramic body of the optical component OBE via a connecting part VT which consists of steel. In order to fix the optical component OBE in the axial direction, provision is made for a stop ANS of annular design.

We claim:

1. A splicing device for welding optical fibers in or close to optical components, which include optical fiber plug connectors, said device comprising:

a first receptacle for the optical component and an associated first optical fiber;

a second receptacle for a second optical fiber, said second receptacle being adjustable in an axial direction of the optical fibers to be welded;

an optical device for observing the ends to be welded of the optical fibers;

two electrodes, which are arranged at a distance from each other and effect the welding of the optical fibers by igniting an arc; and means for mounting the first receptacle to pivot about a pivot axis that is aligned parallel to the axial direction so that an end of the first optical fiber, which is located in or close to the optical component, can be pivoted to a position in between the two electrodes from a position removed from a welding zone of the two electrodes.

2. A splicing device as claimed in claim 1, wherein the optical component is mounted in the first receptacle such that it can be rotated about the optical axis of the first optical fiber.

3. A splicing device as claimed in claim 1, which includes a lever system for the course adjustment of the second receptacle in the axial direction, and a micrometer screw for fine adjustment of the second receptacle in the axial direction.

4. A splicing device as claimed in claim 1, wherein the second receptacle carries an interchangeable adapter to hold the fiber or the cable of the second optical fiber.

5. A splicing device as claimed in claim 1, which includes an additional receptacle (ZA), which can be used alternatively to the first receptacle, for first optical fibers in the form of fibers or cables.

6. A splicing device as claimed in claim 1, wherein the optical device is arranged on a pivotable flap.

7. A splicing device as claimed in claim 6, wherein the optical device is pivotably mounted on the flap.

8. A splicing device as claimed in claim 1, which includes an integrated crimping tool for crimping sleeves onto the cable of the second optical fiber.

9. A splicing device as claimed in claim 8, wherein an upper part of the crimping tool is arranged in a pivotable flap.

10. A splicing device as claimed in claim 1, which includes a first illumination device for directing light illumination on the splice point.

11. A splicing devices as claimed in claim 10, which includes a second illumination device for incident light illumination of the splice point.

12. A splicing device according to claim 1, which includes a piezo-electric drive to shift the second receptacle and the second optical fiber in the axial direction toward the first receptacle during the welding operation.

* * * * *